(12) United States Patent
Ernst (10) Patent No.: US 12,261,565 B2
(45) Date of Patent: Mar. 25, 2025

(54) ELECTRIC MOTOR CONTROL SYSTEM (71) Applicant: Analog Devices International Unlimited Company, Limerick (IE)

(72) Inventor: Thomas Ernst, Pinneberg (DE)

(73) Assignee: ANALOG DEVICES INTERNATIONAL UNLIMITED COMPANY (IE)

( * ) Notice: Subject to any disclaimer, the term of this patent is extended or adjusted under 35 U.S.C. 154(b) by 106 days.

(21) Appl. No.: 18/198,186

(22) Filed: May 16, 2023

(65) Prior Publication Data

US 2024/0388229 A1 Nov. 21, 2024

(51) Int. Cl.
*H02P 8/36* (2006.01)
*H02P 8/16* (2006.01)

(52) U.S. Cl.
CPC . *H02P 8/36* (2013.01); *H02P 8/16* (2013.01)

(58) Field of Classification Search
CPC ..................................... H02P 8/36; H02P 8/16
See application file for complete search history.

(56) References Cited

U.S. PATENT DOCUMENTS

| | | | |
|---|---|---|---|
| 7,417,400 B2 * | 8/2008 | Takeishi | B41J 19/202 318/504 |
| 8,564,230 B2 | 10/2013 | Dwersteg et al. | |
| 9,030,150 B2 | 5/2015 | Dwersteg | |
| 9,112,439 B2 | 8/2015 | Larsson et al. | |
| 10,075,113 B2 | 9/2018 | Dwersteg | |
| 11,437,943 B2 | 9/2022 | Dwersteg | |
| 2008/0304850 A1 | 12/2008 | Groninger et al. | |
| 2012/0050897 A1 * | 3/2012 | Akada | H02P 6/16 318/465 |
| 2018/0013366 A1 * | 1/2018 | Sato | H02P 27/08 |
| 2018/0013374 A1 | 1/2018 | Barfus et al. | |
| 2020/0014326 A1 * | 1/2020 | Miller | G01K 7/18 |
| 2022/0123673 A1 | 4/2022 | Dwersteg | |
| 2023/0097035 A1 * | 3/2023 | Kotikelapudi | H02P 8/12 318/696 |

FOREIGN PATENT DOCUMENTS

| | | | |
|---|---|---|---|
| EP | 3340459 A1 | 6/2018 | |
| EP | 3826170 A1 | 5/2021 | |

* cited by examiner

*Primary Examiner* — Zoheb S Imtiaz (57) ABSTRACT

A new method and circuit arrangement for operating an electric motor, such as a stepper motor, in a control loop for preventing motor stall, the electric motor comprising at least a first motor coil and a second motor coil, the method comprising: operating the electric motor at a velocity equal to the target velocity; receiving a load value associated with an electric motor load; and determining whether the load value is greater than a load value threshold. Based on a determination that the load value is greater than the load value threshold decreasing the velocity of the electric motor to a velocity less than the target velocity.

18 Claims, 8 Drawing Sheets

ELECTRIC MOTOR CONTROL SYSTEM

FIELD

The present application relates to methods and circuit arrangements for controlling an electric motor. Specifically, the present application relates to methods and circuit arrangements for controlling an electric motor, such as a stepper motor, with a control loop to prevent motor stall.

BACKGROUND

It is generally known that in stepper motors, a magnetic rotor is turned stepwise in small angle increments by means of a controlled rotating electromagnetic field which is generated by the motor's stator coils.

The maximum electrical power that can be driven into the stepper motor may be physically limited by: the motor (which defines the maximum current rating); the system supply voltage; and the maximum drive current of the motor drive circuit. Typically, stepper motors are over dimensioned so that the maximum current rating is greater than what is needed for the stepper motor's application.

Some stepper motors are operated in an open loop operation, i.e., the control system does not receive position or load feedback from the stepper motor. The stepper motor is controlled operating a driver stage to provide a target current to the motor coils to move a mechanical load. However, open loop operation does not provide any way to avoid motor stall (which leads to step loss), caused by an error between the commanded position and the actual rotor position.

Sensor-based closed loop systems are known to provide means to avoid motor stall. Such methods are known to receive an input from the stepper motor itself using sensors, such as encoders which can detect the position of the rotor (which can be compared to the successively commanded position). Sensor-based closed loop methods of controlling stepper motors have higher associated implementation cost and design effort than open loop methods.

SUMMARY OF THE DISCLOSURE

The present disclosure describes a new method and circuit arrangement for operating an electric motor in a control loop for preventing motor stall. The electric motor has at least a first motor coil and a second motor coil. A target velocity of the electric motor is set, and the electric motor is operated at a velocity equal to a target velocity. A load value is received which is associated with an electric motor load. It is determined whether the load value is greater than a load value threshold. Based on a determination that the load value is greater than the load value threshold, the velocity of the electric motor is decreased to a velocity less than the target velocity. This prevents motor stall/step loss, due to exceeding the overall power limit of a driver circuit of the electric motor, when compared to an electric motor not implementing the new method and circuit arrangement of the present disclosure, e.g., an open loop electric motor. The electric motor may be a stepper motor.

According to a first aspect there is provided a method of operating an electric motor in a control loop, the electric motor comprising at least a first motor coil and a second motor coil, the method comprising:
operating the electric motor at a velocity equal to a target velocity;
receiving a load value associated with an electric motor load; and
determining whether the load value is greater than a load value threshold and based on a determination that the load value is greater than the load value threshold:
decreasing the velocity of the electric motor to a velocity less than the target velocity.

Optionally, the method further comprises: receiving a first motor coil current from the first motor coil; and receiving a second motor coil current from the second motor coil, wherein the load value is proportional to an absolute value of the first and second coil currents.

Optionally, the method further comprises receiving a load angle of the electric motor, wherein the load value is proportional to the load angle.

Optionally, the load value threshold is an upper load value threshold. The method optionally further comprising: determining whether the load value is less than a lower load value threshold, and based on a determination that the load value is less than the lower load value threshold: and increasing the velocity of the electric motor to the target velocity.

Optionally, the upper load value threshold is between the lower load value threshold and a stall load value which, if exceeded, results in motor stall of the electric motor.

Optionally, the upper load value threshold is greater than the lower load value threshold.

Optionally, the maximum rate of the velocity decrease over time is greater than the maximum rate of the velocity increase over time.

Optionally, the step of increasing the velocity of the electric motor to the target velocity is performed in response to a fixed rate of acceleration.

Optionally, the step of increasing the velocity of the electric motor to the target velocity is performed in response to a variable rate of acceleration, wherein the variable rate of acceleration is determined by a PI-regulator.

Optionally, the step of decreasing the velocity of the electric motor to a velocity less than the target velocity is performed in response to a fixed rate of deceleration.

Optionally, the step of decreasing the velocity of the electric motor to a velocity less than the target velocity is performed in response to a variable rate of deceleration, wherein the variable rate of deceleration is determined by a PI-regulator.

Optionally, the load value threshold is selected to be between 70% and 100% of the stall load value. Optionally, the load value threshold is selected to be between 80% and 100% of the stall load value. Optionally, the load value threshold is selected to be between 90% and 100% of the stall load value.

Optionally, the control loop of the electric motor operates in a sensorless arrangement.

Optionally, the electric motor is a stepper motor.

According to a second aspect there is provided a circuit arrangement for operating an electric motor in a control loop, the electric motor comprising at least a first motor coil and a second motor coil, the circuit comprising:
a control unit, configured to:
operate the electric motor at a velocity equal to a target velocity;
receive a load value associated with an electric motor load; and
determine whether the load value is greater than a load value threshold and based on a determination that the load value is greater than the load value threshold:

decrease the velocity of the electric motor to a velocity less than the target velocity.

Optionally, the circuit arrangement further comprises an analog-to-digital converter configured to: receive a first motor coil current from the first motor coil; and receive a second motor coil current from the second motor coil, wherein the load value is proportional to an absolute value of the first and second coil currents.

Optionally, the load value threshold is an upper load value threshold, wherein the control unit is configured to: determine whether the load value is less than a lower load value threshold and the upper load value threshold, and based on a determination that the load value is less than the lower load value threshold and the upper load value threshold: increase the velocity of the electric motor to the target velocity.

Optionally, increasing the velocity of the electric motor to the target velocity is in response to a variable rate of acceleration, wherein the control unit comprises a PI-regulator configured to determine the variable rate of acceleration.

Optionally, increasing the velocity of the electric motor to the target velocity is in response to a fixed rate of acceleration, wherein the control unit is further configured to determine the variable rate of acceleration.

Optionally, decreasing the velocity of the electric motor to a velocity less than the target velocity is in response to a variable rate of deceleration, wherein the control unit comprises a PI-regulator configured to determine the variable rate of deceleration.

Optionally, decreasing the velocity of the electric motor to a velocity less than the target velocity is in response to a fixed rate of deceleration, wherein the control unit is further configured to determine the variable rate of deceleration.

Optionally, the circuit arrangement operates in a sensorless arrangement.

Optionally, the electric motor is a stepper motor.

DEFINITIONS

An operating mode with a control loop (i.e., an industrial control loop, or closed loop control) generally includes a process variable sensor for sensing a process variable of a process, a controller for receiving an input signal representative of the process variable and for generating an output signal based on the input signal and a setpoint signal representing a desired value of the process variable, and an actuation device for receiving the output signal and for adjusting the process in response to the output signal. The controller uses the control algorithm to compare the setpoint signal to the input signal from the previous iteration of the loop (e.g., at time t=−1) and to generate the output signal for the current iteration of the loop (e.g., at time t=0). The actuation device adjusts the process in order to bring the process variable towards the desired value represented by the setpoint signal, which will be used as the input for the next iteration of the loop (e.g., at time t=1). The controller may be implemented as a computer program executing on a processor, and the process variable sensor, actuation device, and setpoint input may be connected to the controller via electrical or communication links.

A voltage-based operating mode with a control loop is a control loop operating mode which uses voltage signals to generate a control signal for operating a device. A current-based operating mode with a control loop is a control loop operating mode which uses current signals to generate a control signal for operating a device.

Regulating involves correcting for an error between the commanded setpoint and the actual value based on some type of feedback. That is, the output of a regulator is determined which, upon a new iteration of a control loop adjusts the actual value to the commanded setpoint.

Operating a stepper motor involves providing a voltage/current to the motor coils of the stepper motor to induce movement in the rotor/stator of the stepper motor.

Over dimensioning is a standard practice in industry in which an oversized (on the NEMA scale) stepper motor is selected for an industrial/consumer application to ensure compliance.

A mechanical load is the payload which is coupled to the stepper motor's rotating element (typically the rotor).

Motor stall occurs when a stepper motor (and/or associated circuitry) is operated beyond its power limits. For example, if the payload is too large for the motor's rotor to rotate as commanded. This results in step loss because the stepper motor is unable to 'step' when commanded causing an error between the commanded position of the stepper motor's rotor and the actual rotor position. A motor stall event is an event which causes the stepper motor to stall and possibly step loss to occur (if no feedback on the actual rotor position is received by the controller, e.g., in a sensorless operating mode).

DETAILED DESCRIPTION

As a brief non-limiting overview of the invention, the present disclosure provides a method of operating an electric motor in a control loop, for example a stepper motor. The stepper motor is operated to target an operating velocity tailored to the stepper motor's application. If the mechanical load coupled to the stepper motor increases then, to avoid the risk of motor stall, the method monitors a torque load or a representation of the torque load (e.g. load-based scaled motor coil current). If the received torque load breaches a threshold, then the stepper motor is operated to reduce motor velocity, e.g., by decelerating the stepper motor rotor. This enables the stepper motor to increase its torque to overcome the increase in mechanical load while preventing motor stall. The disclosed methods may also be implemented with significantly reduced implementation cost and design effort. That is, the method may be applied directly to a simple open-loop (or closed loop) stepper motor system without changing the existing operating control system, but also benefit from increased resilience to motor stall events. Thus, the reliability of any stepper motor system the method is applied to may be improved as a result. The torque load or representation of the torque load will be referred to herein as a load value.

Figure 1:
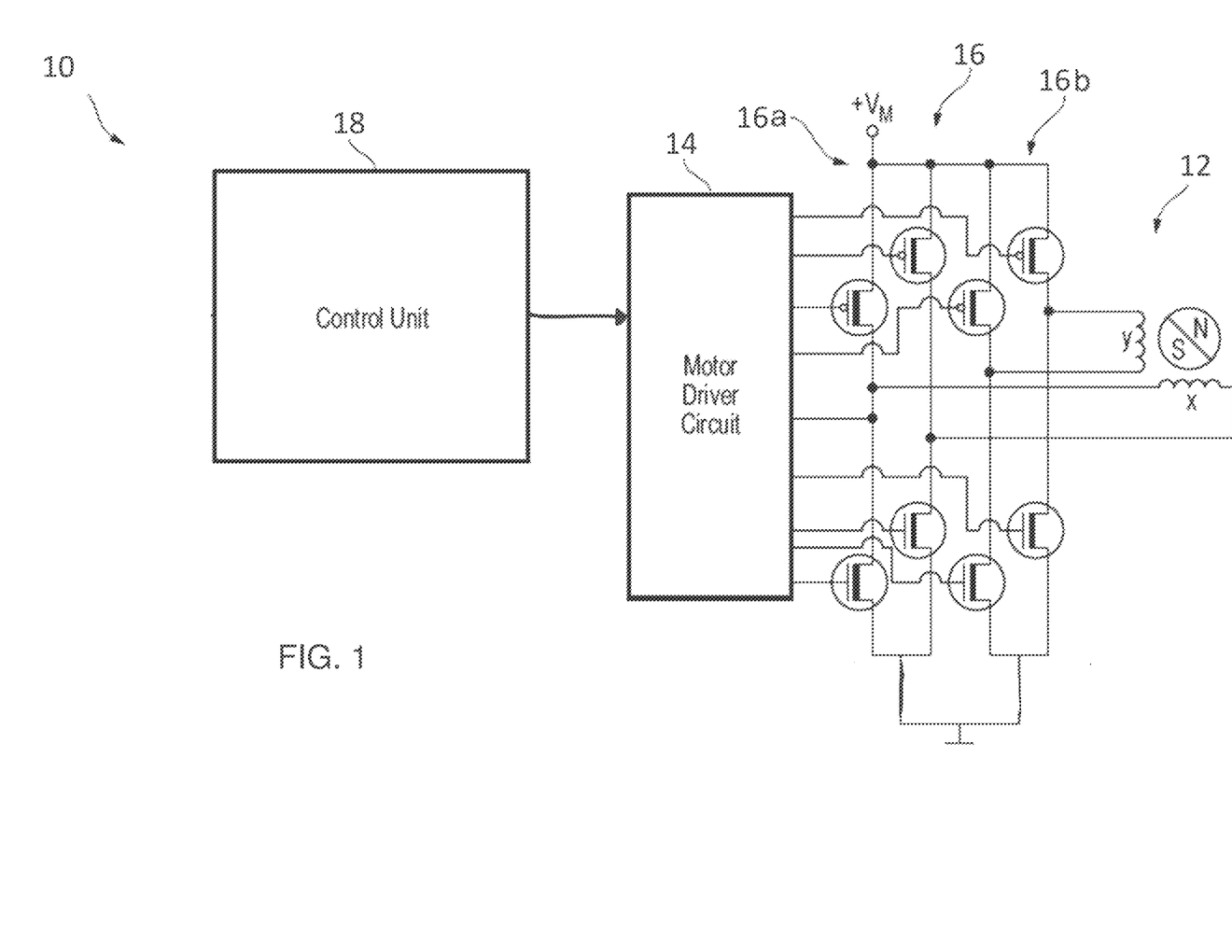
FIG. 1 illustrates a schematic block wiring diagram of a circuit arrangement for operating an electric motor in an open loop operating mode.

FIG. 1 shows an example of a schematic block wiring diagram of a circuit arrangement 10 for an electric motor, such as a stepper motor. The circuit arrangement 10 shows a stepper motor 12 controlled by a control unit 16. The stepper motor 12 is controlled with a motor driver circuit 14, for example a voltage chopper. The motor driver circuit 14 generates a drive voltage for each coil of the stepper motor 12, for example the drive voltage may be a pulse width modulation (PWM) voltage for operating the stepper motor 12.

In a simple case of a 2-phase stepper motor 12 it may be assumed that one of the two coils (e.g., coil x) is subjected to a sinusoidal current course and the other coil (e.g., coil y) is supplied with a current course which is phase-shifted by 90° and thus co-sinusoidal. The stepper motor 12 may also be controlled in micro-step operation with a PWM voltage which results in a substantially sinusoidal motor coil current within the coils x, y. However, the following considerations also apply accordingly in the alternative case of: non-sinusoidal motor coil current; stepper motors with the same or a different number of phases; an associated phase shift of the motor coil currents relative to one another which is not 90°; and/or a stepper motor operated in a full- and a half-step operation.

A PWM voltage may be generated from a motor supply voltage, such that the amplitude of the motor supply voltage defines the amplitude of the PWM voltage. In particular, the motor supply voltage can be pulse-width-modulated and applied with corresponding polarity to the motor coils x, y. The duty factor of this modulation being controlled or regulated in such a way that the resulting effective voltage across the motor coils each has an amount which causes an instantaneous motor coil current value to flow. Alternatively, other methods may be used to cause the instantaneous target motor coil currents value to flow. The control of the PWM may be based on a voltage-based control signal using known methods.

The circuit arrangement 10 comprises, as components known per se, an integrated motor driver circuit 14, with which via outputs, first and second bridge circuits 16a, 16b are controlled. The bridge circuits 16 are arranged between a supply voltage +VM and ground. In order to operate the stepper motor, a first PWM voltage signal is applied to the coil x and a second PWM voltage signal is applied to the coil y. The motor driver circuit 14 receives a voltage-based control signal in order to control the amplitude or the amount of the voltage applied to each coil, or the duty factor of the PWM voltages, e.g. via a control unit 26. Since these motor driver circuit 14 units are known per se, they do not need to be described in more detail.

The stepper motor 12 can operate such that the power on its rotated motor shaft with a certain applied external force scales linearly with the velocity;

$$P_{load} = \frac{\Delta E_{load}}{\Delta t} = \tau * \omega = F * r * \omega \quad (1)$$

where torque $\tau$, angular velocity $\omega$, external force F, and r is the radius of the stepper motor shaft.

Figure 2:
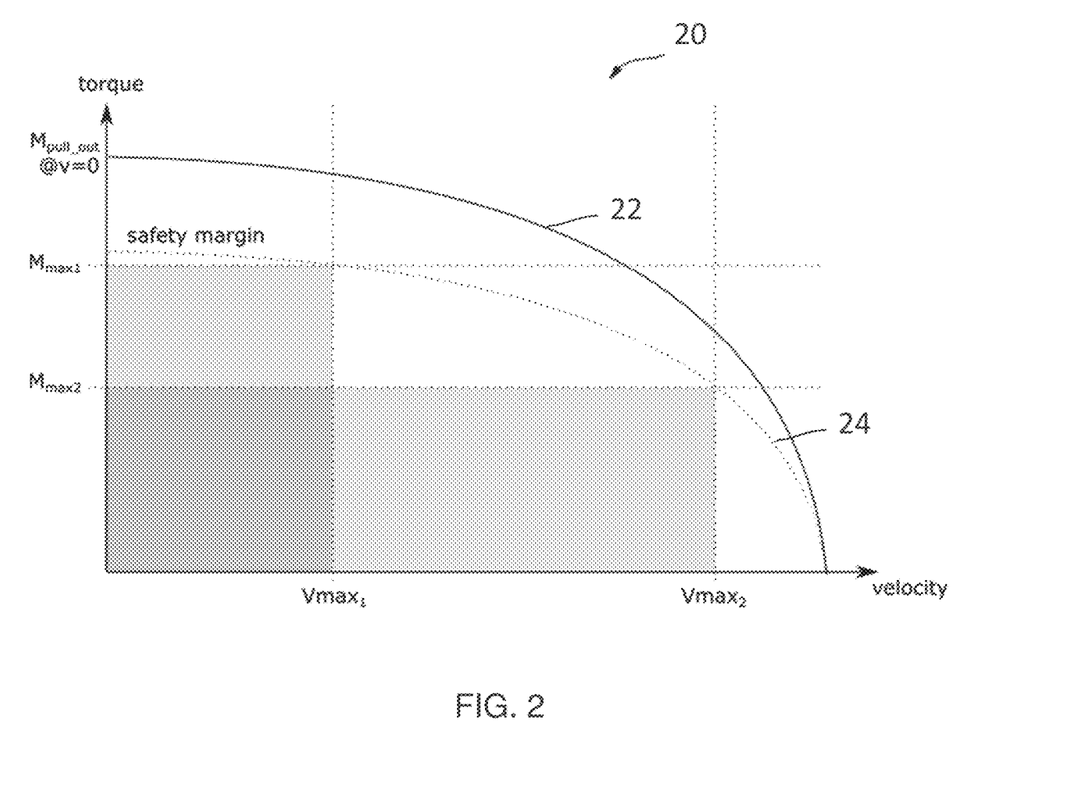
FIG. 2 illustrates a graph representing an open loop operating mode of an electric motor, showing velocity against torque.

FIG. 2 shows a representation of an open loop operating mode on a graph 20. The velocity of the stepper motor is shown on the x-axis, and the torque of the stepper motor is shown on the y-axis.

The graph 20 shows a line 22 representing the maximum power output of the stepper motor 12. The line 22 also represents the limitation in electrical power and the dependency of the mechanical power on the velocity in combination with the external applied force. Thus, there is a trade-off between the maximum allowed velocity and the maximum allowed torque. If the stepper motor 12 is operated to exceed the line 22 then motor stall will occur. All stepper motors may be characterised such that the line 22 represents the maximum power output of any stepper motor and can be determined (e.g., through experimentation) or may be generally readily available (e.g., from datasheets).

It is generally known to operate stepper motors in open loops with a safety margin shown by the dashed safety margin line 24. The purpose of the safety margin line 24 is to set an artificial limit to the drive operation of the stepper motor 12 so that if a transient increase in the mechanical load is provided to the stepper motor, then torque can increase beyond the safety margin line 24, but within the line 22, temporarily without motor stall. This reduces the risk of motor stall, however, this also reduces the power handling of the stepper motor 12 because it is not being operated near its maximum power. This leads to system designers over dimensioning stepper motors for certain applications.

The graph 20 shows how a high torque requirement $M_{max_1}$ limits the maximum allowed velocity to $V_{max_1}$. In contrast the high velocity requirement of $V_{max_2}$ limits the maximum allowed torque to $M_{max_2}$.

A problem with a known operating mode is that if a control system is operated to target a specific velocity and a load on the stepper motor is increased, then to maintain the target velocity the torque on the stepper motor must increase. The combination of high speed and torque may require more power than the driver circuit can provide (or the stepper motor is rated for) which may result in motor stall, also called step loss.

In addition, known closed loop systems may be implemented which use encoders to detect the position of the rotor of the stepper motor 12. Such systems may remove the need for a safety margin and operate a stepper motor close to the line 22. However, such systems require significantly higher design effort, die space, and cost to implement. Moreover, encoders may not be suitable for all applications and may require additional calibrations.

Examples of the invention solve the above problems with stepper motor control methods. Examples of the invention are described below.

Figure 3:
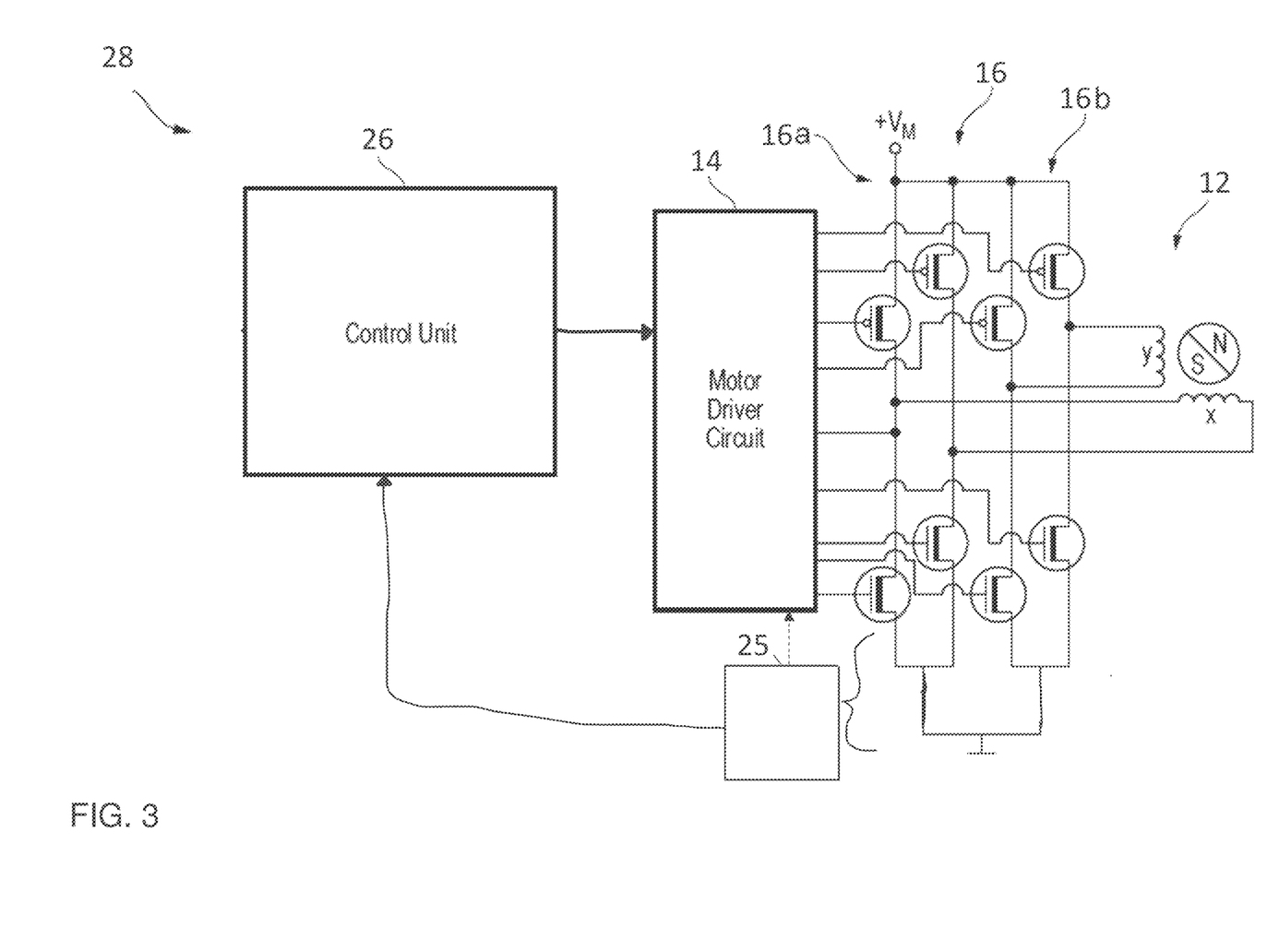
FIG. 3 illustrates a schematic block wiring diagram of a circuit arrangement for operating an electric motor in a control loop.

FIG. 3 shows a circuit arrangement 28 according to an example of the invention. The circuit arrangement 28 of FIG. 3 is similar to the circuit arrangement 10 of FIG. 1 and for brevity the following description will focus on the differences and like parts have been given the same reference numerals.

The circuit arrangement 28 operates the stepper motor 12 in a control loop. The control loop may be implemented with, for example, a hysteresis controller or a PI regulator. A control unit 26 receives a feedback signal from the stepper motor 12, e.g., a coil current (for one or more motor coils of the stepper motor 12), and/or a sensor measurement from an encoder, etc., via a feedback means 25.

For example, the control unit 26 may receive a measurement of the actual motor coil current to regulate a duty factor of the PWM voltage applied to the respective motor coil via a closed loop voltage-based operating mode (that is, a voltage-based operating mode with a control loop). The actual motor coil current can be detected by the feedback means 25, for example, by means of an analog-to-digital converter (ADC) in order to control the amplitude or the amount of the voltage applied to the coil, or the duty factor of the PWM voltage, e.g. via a regulator, preferably a PI-regulator. Alternatively, the circuit arrangement 28 may operate in a current-based operating mode with a control loop.

Optionally, if the control loop is a sensor-free closed loop, then the motor driver circuit 14 may also receive as an input a coil current via the feedback means 25 to aid in achieving a target current.

An operation of the stepper motor 12 will now be described in relation to FIGS. 4 to 6. The control unit 26 may be configured to implement a method which may output a signal suitable for operating the stepper motor 12 in accordance with examples of the invention.

Figure 4:
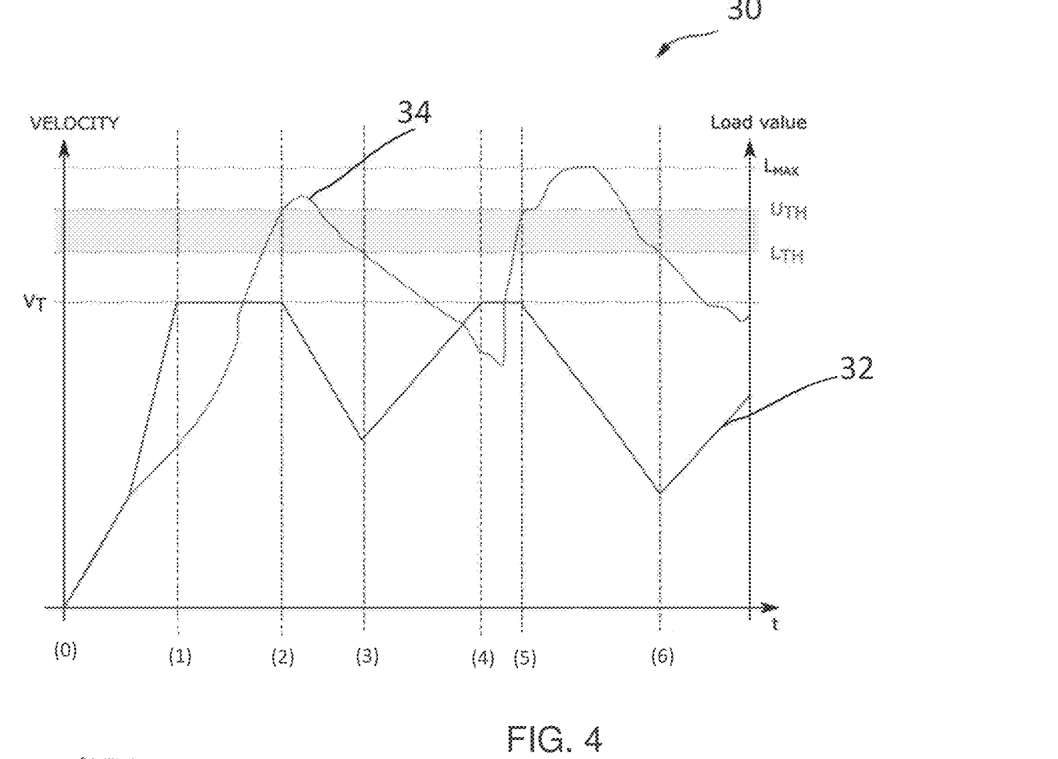
FIG. 4 illustrates a graph representing a control loop of an electric motor, showing how velocity and load value change over time.

FIG. 4 shows a graph 30 representing the operation of the stepper motor 12 controlled in accordance with the invention. Time is represented along the x-axis, with six example events: (1) to (6), for the purposes of explanation. The blue line shows a velocity 32 of the stepper motor 12 along the left-most y-axis. The red line shows a load value 34 of the stepper motor 12 along the right-most y-axis.

Figure 5:
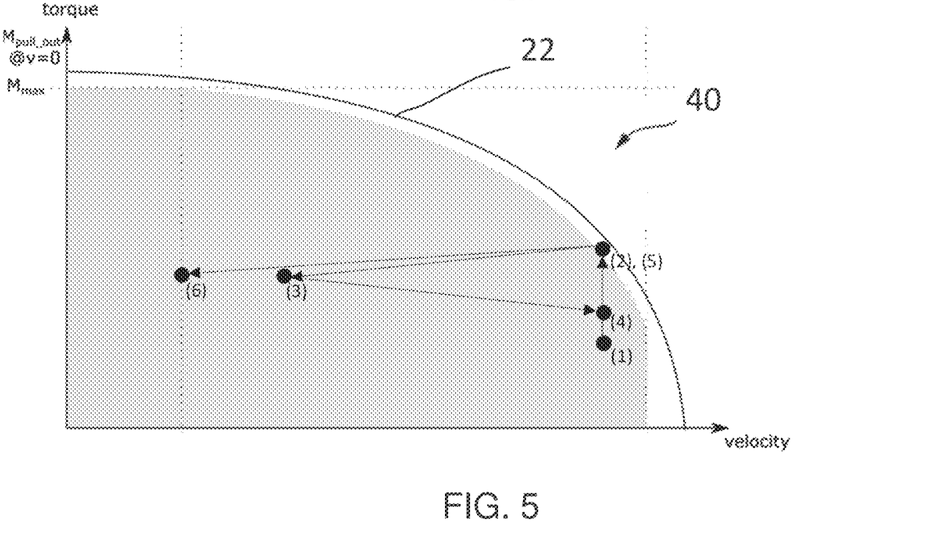
FIG. 5 illustrates a graph representing the control loop of an electric motor operating in accordance with FIG. 4, showing velocity against torque.

FIG. 5 shows a graph 40 corresponding to the graph 30 of FIG. 4. The graph 40 shows the line 22 (of FIG. 2) representing the maximum power output of the stepper motor 12. The line 22 (or data representing the line 22) may be predetermined and stored on a memory.

The load value may be proportional to a mechanical load on the rotor of the stepper motor, such that if the rotor requires more torque to rotate at a given velocity, then the load value will increase. The load value may be a motor coil current or a load angle of the stepper motor. The load value therefore has a maximum load value $L_{max}$ which may be equivalent to the maximum power output of the stepper motor (i.e., a stall load value: a load value which results in motor stall of the stepper motor 12), or a safety margin. If a safety margin is used, then the safety margin may be greatly reduced when compared to the safety margin 24 of FIG. 2 to achieve equivalent (or even reduced) motor stall events. The upper load value threshold $U_{TH}$ may be substantially close to the maximum load value $L_{max}$. For example, the upper load value threshold $U_{TH}$ may be selected to be between 90% (or, 80%, 70%) and 100% of the maximum load value $L_{max}$. For example, the lower load value threshold $L_{TH}$ (if it is not equal to the upper load value threshold $U_{TH}$) may be selected to be between 70% (or 60%, 50%) and 90% (or 80%, 70%) of the maximum load value $L_{max}$.

The upper load value threshold may be different to the lower load value threshold. For example, the upper load value threshold may be between the lower load value threshold and the maximum load value $L_{max}$ of the stepper motor. The maximum load value $L_{max}$ may be the load value which, if exceeded, results in motor stall of the stepper motor 12. In an example, the maximum load value $L_{max}$ may be a load value that represents a torque of 1 Nm, the upper and lower load value thresholds may be values representing 0.9 Nm and 0.7 Nm, respectively.

In an example, the load value may be associated with (e.g., proportional to) the torque resulting from a single motor coil current. Alternatively, the load value may also be determined based on a function of the first motor coil current and the second motor coil current, for example, if the current is scaled (up or down) according to the load value by an optional additional control loop. If the load value is represented by a motor coil current of the stepper motor 12, then the maximum load value $L_{max}$ may correspond to the maximum drive current of the motor drive circuit 14. The control unit 18 may receive a first motor coil current from the first stepper motor coil x and a second motor coil current from the second stepper motor coil y. The load value may be associated with (e.g., proportional to) an absolute torque output resulting from the first and second coil currents. This is an example of a sensor-free implementation, i.e., the control loop of the stepper motor operates without the use of (e.g., the circuit arrangement 28 does not receive an input from) a rotor position sensor, i.e., in a sensorless arrangement. The upper and lower load value thresholds may represent torque limits, e.g., 0.9 Nm and 0.7 Nm, respectively.

In another example, if the load value is a load angle of the stepper motor, then the maximum load value $L_{max}$ may be a maximum load angle of the stepper motor without stalling, i.e., 90 degrees. The control unit 18 may receive the load angle of the stepper motor 12 via the feedback means 25. The load angle may be derived from at least known stepper motor 12 characteristics, and the coil current and/or encoder readings, using known methods. Therefore, the load value may be proportional to the load angle. The upper and lower load value thresholds may be angles, e.g., 85 degrees and 75 degrees, respectively. Depending on how the load angle is derived, this example may either be sensor-based (e.g., if using encoders) or sensor-free (e.g., if using coil currents). Alternatively, the load value is a load reserve of the stepper motor, load reserve, wherein the load reserve is the load angle minus 90° (i.e., 0 degrees represents the maximum load reserve of the stepper motor without stalling). The upper and lower load value thresholds may be angles, e.g., −5 degrees and −15 degrees, respectively.

Returning to FIG. 4, the control unit 26 determines (e.g., the control unit 26 may set, determine, retrieve, or receive) a target velocity $V_T$ of the stepper motor 12. The target velocity $V_T$ is the velocity at which the stepper motor 12 should ideally operate at for a given application. That is, the velocity at which the stepper motor 12 should ideally operate at if there were no power restrictions, or the velocity at which the stepper motor 12 would operate at if the load value does not exceed a maximum load value (e.g., load value threshold).

At point (0), the stepper motor 12 starts from 0 velocity. The stepper motor 12 may then be operated up to an enable velocity $V_{EN}$ in accordance with a start-up procedure. The enable velocity $V_{EN}$ may be a minimum velocity in which the circuit arrangement 28 can operate the stepper motor 12 in a control loop. Below the enable velocity $V_{EN}$, the stepper motor 12 may be operated with open loop control. The enable velocity $V_{EN}$ may be zero.

After a start-up procedure (if necessary), the stepper motor 12 is operated at a velocity equal to the target velocity $V_T$, as shown between time points (1) and (2). While the stepper motor 12 is operated in a control loop, the control unit 26 receives a load value associated with a stepper motor load (i.e., a mechanical load coupled to the stepper motor 12). The graph 30 shows that between time points (1) and (2) the load value 34 increases. This indicates that more torque is required to operate the stepper motor 12 at the target velocity $V_T$. Graph 40 of FIG. 5 shows the torque increasing between the points (1) and (2).

The control unit 26 determines whether the load value 34 is greater than an upper load value threshold $U_{TH}$. In addition, if the load value 34 is greater than the upper load value threshold $U_{TH}$, then the control unit 26 operates the stepper motor 12 to decrease the velocity of the stepper motor 12 to a velocity less than the target velocity $V_T$ in response to a commanded deceleration. This prevents motor stall/step loss due to exceeding the power limit of the circuit arrangement 28. The graph 30 shows that between time points (2) and (3) the velocity of the stepper motor 12 decreases at a fixed rate of deceleration. The graph 40 of FIG. 5 shows the velocity decrease between points (2) and (3). A decrease in velocity allows the stepper motor 12 to increase its torque without exceeding the power limits of the stepper motor 12 or the motor driver circuit 14, until the increased stepper motor load is overcome. A fixed rate of deceleration allows the available torque to also increase at a proportional rate, supported by the flywheel mass of the moving motor, thereby improving the possibility of overcoming a temporary high mechanical load. This improves the reliability of the stepper motor control.

In an example, the control unit 26 may also determine whether the load value 34 is less than a lower load value threshold $L_{TH}$. The lower load value threshold LTIl may be less than the upper load value threshold $U_{TH}$, such that a load value at the upper load value threshold $U_{TH}$ is closer to the maximum load value $L_{max}$ of the stepper motor 12 than a load value at the lower load value threshold $L_{TH}$. In addition, if the load value 34 is less than the lower load value threshold $L_{TH}$, then the control unit 26 operates the stepper motor 12 to increase the velocity to the target velocity in response to a commanded acceleration. This indicates that the stepper motor 12 has overcome a high torque requirement and allows the stepper motor 12 to return to the target velocity $V_T$ without exceeding the power limit of the circuit arrangement 28. The graph 30 shows that between time points (3) and (4) the velocity 32 of the stepper motor 12 increases at a fixed rate of acceleration. The graph 40 of FIG. 5 shows the velocity 32 increase between points (3) and (4). The detected decrease in load value 34 allows the stepper motor 12 to increase its velocity without exceeding the power limits of the stepper motor 12 or the motor driver circuit 14, until the target velocity $V_T$ is achieved or the load value 34 exceeds the upper load value threshold $U_{TH}$. A fixed rate of acceleration allows the available torque to also decrease at a proportional rate. A slower rate of acceleration improves the reliability of the system, however, it also reduces the proportion of time in which the stepper motor operates at its target velocity $V_T$.

FIGS. 4 and 5 also show how the load value 34 changes between points (4) and (6), and how the velocity 32 reacts in accordance with some examples. Although, it can be seen that the process is similar to that described above between points (1) and (3).

In an example, the upper load value threshold $U_{TH}$ may be equal to the lower load value threshold $L_{TH}$. However, hysteresis control can be achieved if the upper and lower load value thresholds are different. Hysteresis control is enabled when the load value hits an upper load value threshold and can be disabled when the load value hits a lower load value threshold. Hysteresis control advantageously allows for increased reliability. The difference between the upper load value threshold $U_{TH}$ and the lower load value threshold $L_{TH}$ may be predetermined or actively controlled based on the application of the stepper motor 12.

The control unit 26 may determine the commanded acceleration (i.e., the rate of velocity increase) and/or the commanded deceleration (i.e., the rate of velocity decrease). FIG. 4 shows the commanded acceleration is a fixed rate of acceleration, and the commanded deceleration is a fixed rate of deceleration. The control unit 26 may command the velocity of the stepper motor 12 to decrease towards zero, or the enable velocity $V_{EN}$. If the velocity of the stepper motor 12 decreases to zero or below the enable velocity $V_{EN}$, then the velocity may increase up to an enable velocity $V_{EN}$ in accordance with a start-up procedure. Alternatively, if the velocity of the stepper motor 12 decreases below the enable velocity $V_{EN}$, then the stepper motor may be operated in an open loop to further reduce the velocity to zero.

In an example, the maximum rate of the commanded deceleration is greater than the maximum rate of the commanded acceleration. This provides the advantage of a fast increase in the available torque when the load value is increasing and is close to the maximum load value $L_{max}$ (e.g., a fast movement away from the line 22 of FIG. 5), and a more cautious return to the target velocity $V_T$ (i.e., a slow movement towards the line 22 of FIG. 5). Thus, providing more reliable operation of the stepper motor 12.

Figure 6:
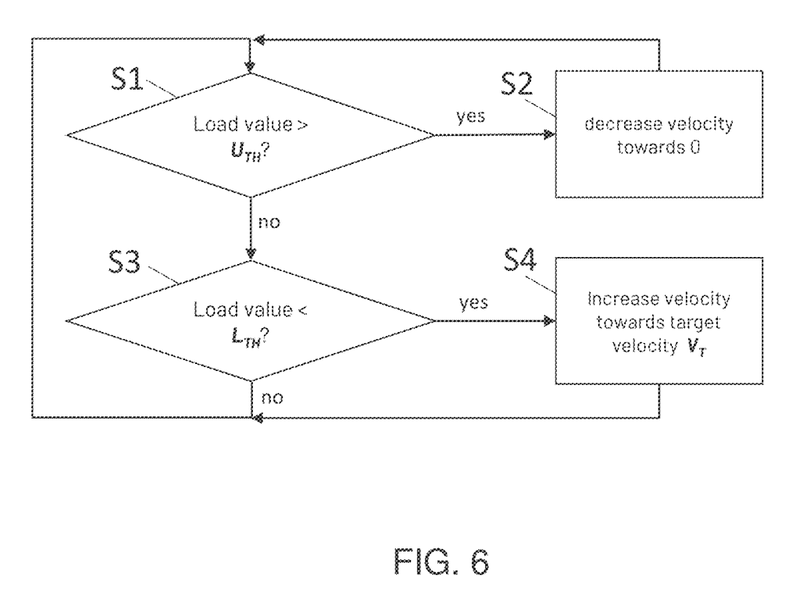
FIG. 6 illustrates a flow diagram of a method for operating an electric motor in a control loop.

FIG. 6 shows a flow diagram of a method in accordance with an example. The method may be applied to other stepper motor control schemes to improve the reliability of a stepper motor by reducing the possibility of motor stall in stepper motors comprising at least a first motor coil and a second motor coil. Such a method, as shown in FIG. 6 may comprise the following steps:

S1: receiving a load value associated with a stepper motor load and determining whether the load value is greater than an upper load value threshold $U_{TH}$.

S2: based on a determination that the load value is greater than the upper load value threshold UT, decreasing the velocity of the stepper motor 12 to a velocity less than the target velocity $V_T$ in response to a commanded deceleration.

S3: receiving a load value associated with a stepper motor load and determining whether the load value is less than a lower load value threshold $L_{TH}$.

S4: based on a determination that the load value is less than the lower load value threshold $L_{TH}$ and the upper load value threshold $U_{TH}$, increasing the velocity of the stepper motor 12 to the target velocity $V_T$ in response to a commanded acceleration.

Figure 7:
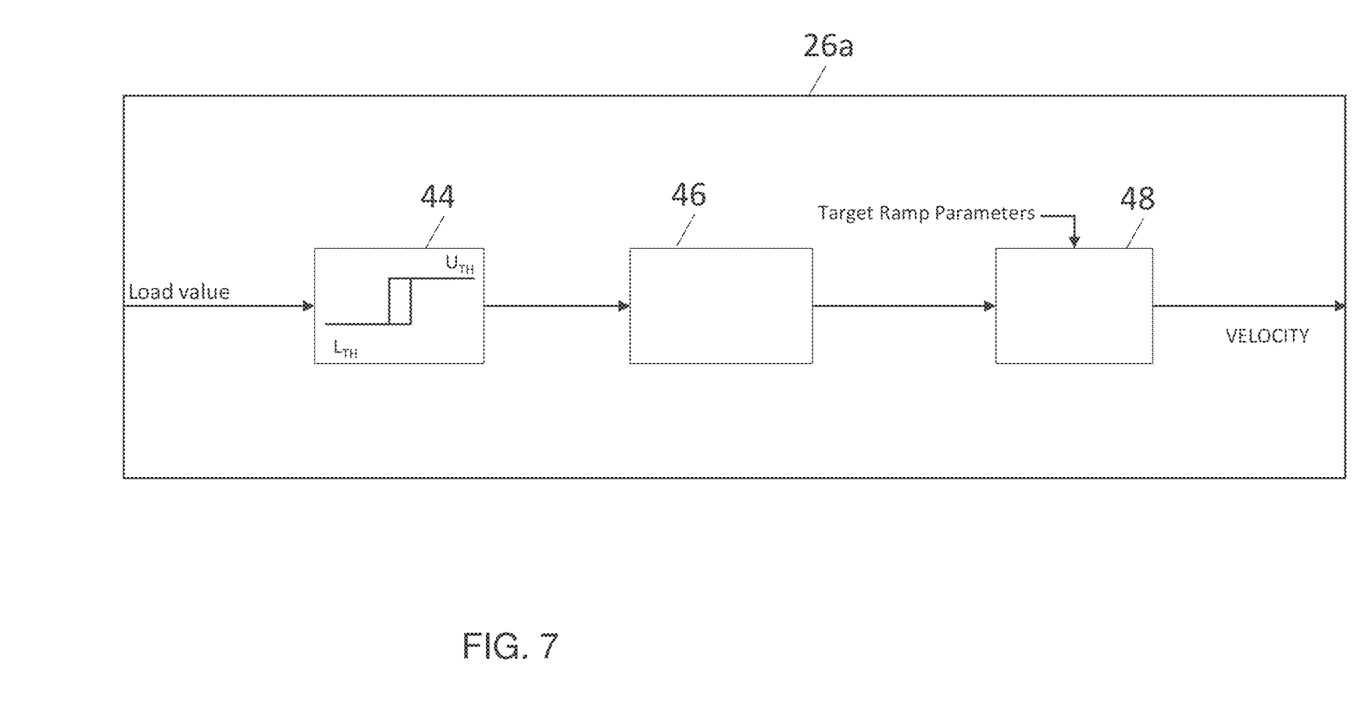
FIG. 7 illustrates a schematic block wiring diagram of a control unit for implementing in the circuit arrangement of FIG. 3.
Figure 9:
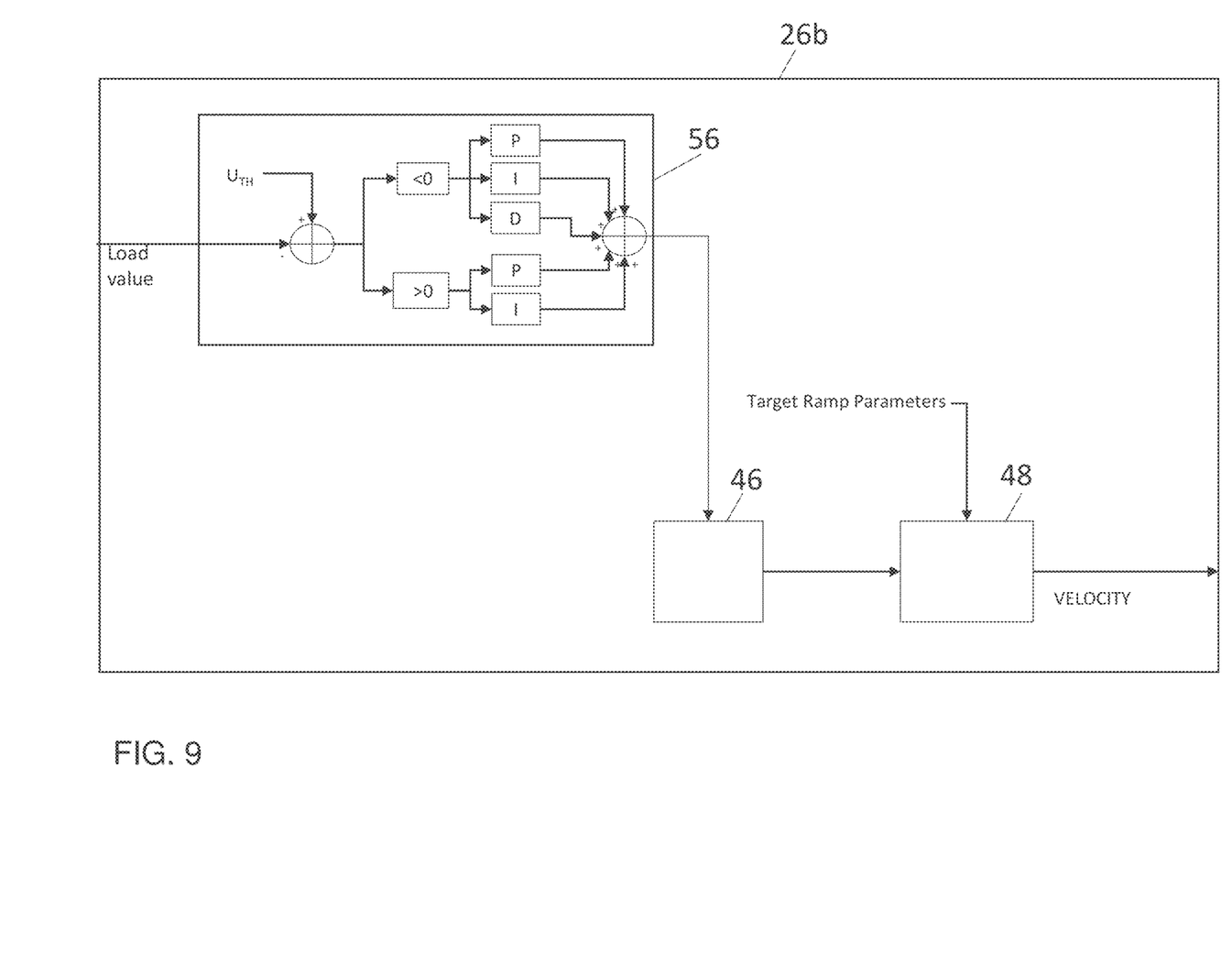
FIG. 9 illustrates an alternative schematic block wiring diagram of a control unit for implementing in the circuit arrangement of FIG. 3.

FIGS. 7 and 9 show two example implementations of the control unit which may implement a method in accordance with examples. As shown in FIG. 7, the control loop may be implemented with a hysteresis controller. As shown in FIG. 9, the control loop may be implemented with a PI regulator.

FIG. 7 shows a control unit 26a which may operate the stepper motor 12 as shown in FIGS. 4 and 5. The control unit 26a comprises a hysteresis block 44, a velocity limiting block 46, and a ramp controller block 48. The blocks 44, 46, 48 of the control unit 26a may be implemented in software or hardware.

The control unit 26a receives a load value at its input. The load value is provided to the hysteresis block 44. The hysteresis block 44 is configured to determine if the load value was previously less than the lower load value threshold $L_{TH}$ and is currently greater than the upper load value threshold $U_{TH}$, and determine if the load value was previously greater than the upper load value threshold $U_{TH}$ and is currently less than the lower load value threshold $L_{TH}$ (as described at FIG. 6). The output of the hysteresis block 44 is an instruction to increase or decrease velocity in accordance with the method of FIG. 6. The output of the hysteresis block 44 is input into the velocity limiting block 46 which can set and output a velocity limit for the stepper motor 12 to operate at. The velocity limit is a commanded velocity which can decrease to follow the commanded deceleration (i.e., the velocity of the stepper motor 12 will operate at the commanded velocity). Therefore, the hysteresis control is enabled when the load value hits an upper load value threshold and can be disabled when the load value hits a lower load value threshold. The output of the velocity limiting block 46 is input into the ramp controller block 48. The ramp controller block 48 also receives target ramp parameters. When the velocity limit is lifted the ramp controller block 48 is configured to increase the velocity towards the target velocity $V_T$ according to the target ramp parameters, i.e., a commanded acceleration. The output of the control unit 26a is therefore, a velocity which the stepper motor 12 is operated at.

In addition, the velocity limiting block 46 can set a velocity limit which can increase to follow a limited commanded acceleration. The limited commanded acceleration can have a rate of acceleration less than the rate of acceleration determined by the target ramp parameters. This can avoid oscillating between acceleration and deceleration states, resulting in more efficient stepper motor control. The limited commanded acceleration can have a rate of acceleration higher than the rate of acceleration determined by the target ramp parameters. This may improve the overall dynamic of the system (maximum acceleration) and reaction to dynamic changes of the payload.

Figure 8:
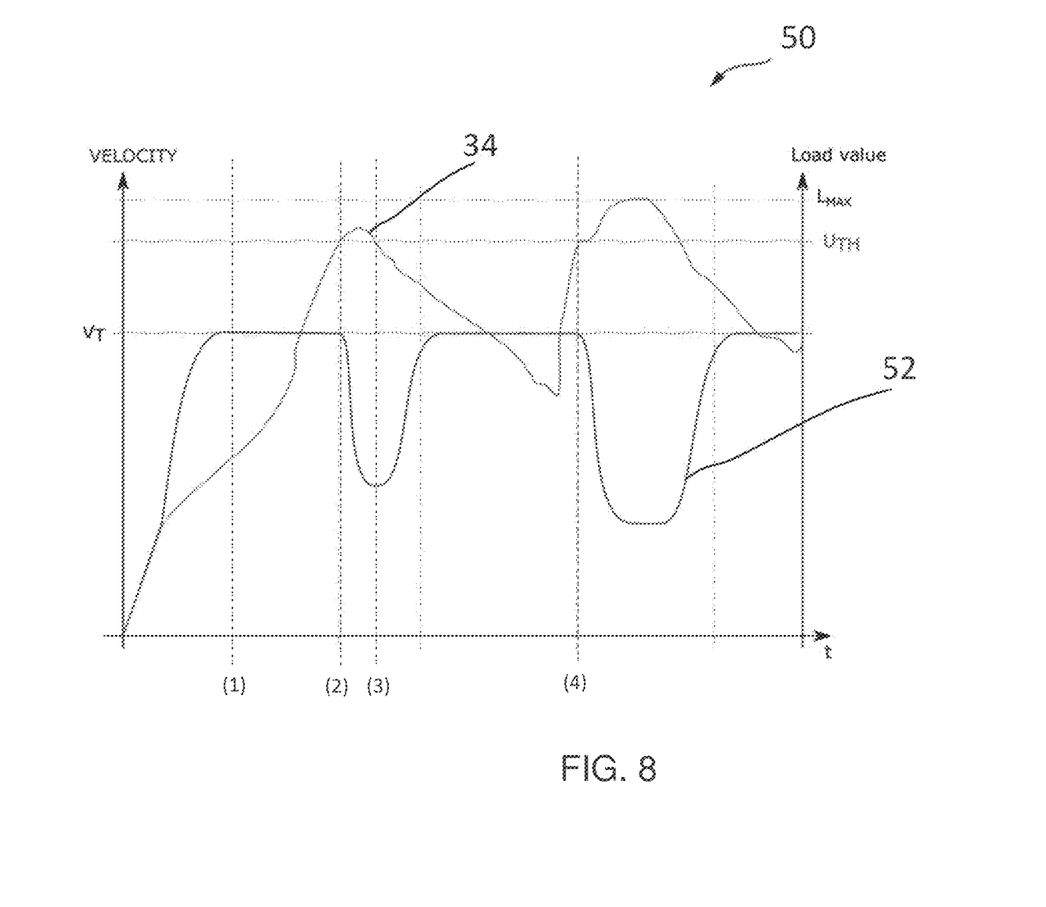
FIG. 8 illustrates an alternative graph representing a control loop of an electric motor, showing how velocity and load value change over time.

FIG. 8 shows a graph 50 representing the operation of the stepper motor 12 controlled in accordance with the invention. Time is represented along the x-axis, with four example events: (1) to (4), for the purposes of explanation. The blue line shows a velocity 52 of the stepper motor 12 along the y-axis. The red line shows the load value 34 of the stepper motor 12 along the y-axis (also shown in FIG. 4). The control of the stepper motor 12 is similar to the control shown in FIG. 4 except for three differences: a single load value threshold $U_{TH}$, the commanded acceleration is a variable rate of acceleration, and the commanded deceleration is a variable rate of deceleration. Each of these differences may be implemented independently and may be combined with features of other examples.

After a start-up procedure (if necessary), the stepper motor 12 is operated at a velocity equal to the target velocity $V_T$, as shown between time points (1) and (2). The graph 50 shows that between time points (1) and (2) the load value 34 increases. This indicates that more torque is required to operate the stepper motor 12 at the target velocity $V_T$.

If the load value 34 is greater than the load value threshold $U_{TH}$, then the control unit operates the stepper motor 12 to decrease the velocity of the stepper motor 12 to a velocity less than the target velocity $V_T$ in response to a commanded deceleration. This prevents motor stall/step loss due to exceeding the stepper motor driver current limit. The graph 50 shows that between time points (2) and (3) the velocity of the stepper motor 12 decreases at a variable rate of deceleration. A variable rate of deceleration allows the available torque to also increase at a fast rate to provide an improved response to sudden mechanical overload situations.

If the load value 34 is less than the load value threshold $U_{TH}$, then the control unit operates the stepper motor 12 to increase the velocity of the stepper motor 12 to the target velocity in response to a commanded acceleration. This allows the stepper motor 12 to return to the target velocity $V_T$ without exceeding the power limit of the circuit arrangement 28. The graph 50 shows that between time points (3) and (4) the velocity 32 of the stepper motor 12 increases at a variable rate of acceleration until the target velocity $V_T$ is achieved (or the load value 34 exceeds the load value threshold $U_{TH}$). A variable rate of acceleration enables an improvement in the stepper motor's reaction to achieve the target velocity $V_T$. This enables the stepper motor 12 to operate as fast as possible while still achieving reduced motor stall events.

FIG. 9 shows a control unit 26b which may operate the stepper motor 12 as shown in FIG. 8. The control unit 26a comprises a PI-regulator block 56, a velocity limiting block 46, and a ramp controller block 48. The blocks 56, 46, 48 of the control unit 26a may be implemented in software or hardware. The velocity limiting block 46 and a ramp controller block 48 of FIG. 9 is similar to the velocity limiting block 46 and a ramp controller block 48 of FIG. 7 and for brevity the following description will focus on the differences and like parts have been given the same reference numerals. The variable rates of acceleration and/or deceleration may be determined by the PI-regulator block 56.

The control unit 26b receives a load value at its input. The load value is provided to the PI-regulator block 56. The PI-regulator block 56 is configured to determine if the load value is greater than or less than the load value threshold $U_{TH}$. The output of the PI-regulator block 56 is an instruction to increase or decrease velocity with respect to time (i.e., acceleration, or deceleration rate). The output of the PI-regulator block 56 is input into the velocity limiting block 46. The PI-regulator block 56 may implement a PID (proportional integral derivative) control for a commanded deceleration, and/or the PI-regulator block 56 may implement a PI (proportional integral) control for a commanded acceleration. Other implementations other than shown in FIGS. 7 and 9 may be used.

Any combination of fixed and variable rates of acceleration or deceleration may be implemented depending on the particular technical application of the stepper motor.

The output of control units 26a, 26b represents a commanded velocity. This may be achieved by a voltage-based control signal, or a current based control signal. In addition, the output may also represent a motor position using known microstep sequencers (not shown).

The velocity 32, 52 acceleration/deceleration profiles shown in FIGS. 4 and 8 are smooth and continuous. However, depending on the implementation of methods of an example, the acceleration and/or deceleration may be implemented as step changes in velocity. The step changes in velocity may be averaged to achieve the velocity 32, 52 acceleration/deceleration profiles shown in FIGS. 4 and 8.

Numbered Clauses

By way of non-limiting example, some aspects of the disclosure are set out in the following numbered clauses.

Clause 1—A method of operating an electric motor in a control loop, the electric motor comprising at least a first motor coil and a second motor coil, the method comprising:
  operating the electric motor at a velocity equal to a target velocity;
  receiving a load value associated with an electric motor load; and
  determining whether the load value is greater than a load value threshold and based on a determination that the load value is greater than the load value threshold:

decreasing the velocity of the electric motor to a velocity less than the target velocity.

Clause 2—The method of clause 1, further comprising:
receiving a first motor coil current from the first motor coil;
receiving a second motor coil current from the second motor coil, wherein the load value is proportional to an absolute value of the first and second coil currents.

Clause 3—The method of clause 1, further comprising:
receiving a load angle of the electric motor, wherein the load value is proportional to the load angle.

Clause 4—The method of any preceding clause, wherein the load value threshold is an upper load value threshold, the method further comprising:
determining whether the load value is less than a lower load value threshold, and based on a determination that the load value is less than the lower load value threshold:
increasing the velocity of the electric motor to the target velocity.

Clause 5—The method of clause 4, wherein the upper load value threshold is between the lower load value threshold and a stall load value which, if exceeded, results in motor stall of the electric motor.

Clause 6—The method of clause 5, wherein the upper load value threshold is greater than the lower load value threshold.

Clause 7—The method of any of clauses 4 to 6, wherein the maximum rate of the velocity decrease over time is greater than the maximum rate of the velocity increase over time.

Clause 8—The method of any of clauses 4 to 7, wherein the step of increasing the velocity of the electric motor to the target velocity is performed in response to a fixed rate of acceleration.

Clause 9—The method of any of clauses 4 to 7, wherein the step of increasing the velocity of the electric motor to the target velocity is performed in response to a variable rate of acceleration, wherein the variable rate of acceleration is determined by a PI-regulator.

Clause 10—The method of any preceding clause, wherein the step of decreasing the velocity of the electric motor to a velocity less than the target velocity is performed in response to a fixed rate of deceleration.

Clause 11—The method of any preceding clause, wherein the step of decreasing the velocity of the electric motor to a velocity less than the target velocity is performed in response to a variable rate of deceleration, wherein the variable rate of deceleration is determined by a PI-regulator.

Clause 12—The method of any preceding clause, wherein the load value threshold is selected to be between 70% and 100% of the stall load value which.

Clause 13—The method of any preceding clause, wherein the control loop of the electric motor operates in a sensorless arrangement.

Clause 14—The method of any preceding clause, wherein the electric motor is a stepper motor.

Clause 15—A circuit arrangement for operating an electric motor in a control loop, the electric motor comprising at least a first motor coil and a second motor coil, the circuit comprising:
a control unit, configured to:
operate the electric motor at a velocity equal to a target velocity;
receive a load value associated with an electric motor load; and
determine whether the load value is greater than a load value threshold and based on a determination that the load value is greater than the load value threshold:
decrease the velocity of the electric motor to a velocity less than the target velocity.

Clause 16—The circuit arrangement of clause 15, further comprising an analog-to-digital converter configured to:
receive a first motor coil current from the first motor coil;
receive a second motor coil current from the second motor coil, wherein the load value is proportional to an absolute value of the first and second coil currents.

Clause 17—The circuit arrangement of clause 15 or 16, wherein the load value threshold is an upper load value threshold, wherein the control unit is configured to:
determine whether the load value is less than a lower load value threshold and the upper load value threshold, and based on a determination that the load value is less than the lower load value threshold and the upper load value threshold:
increase the velocity of the electric motor to the target velocity.

Clause 18—The circuit arrangement of clause 17, wherein increasing the velocity of the electric motor to the target velocity is in response to a variable rate of acceleration, wherein the control unit comprises a PI-regulator configured to determine the variable rate of acceleration.

Clause 19—The circuit arrangement of clause 17, wherein increasing the velocity of the electric motor to the target velocity is in response to a fixed rate of acceleration, wherein the control unit is further configured to determine the variable rate of acceleration.

Clause 20—The circuit arrangement of any of clauses 15 to 19, wherein decreasing the velocity of the electric motor to a velocity less than the target velocity is in response to a variable rate of deceleration, wherein the control unit comprises a PI-regulator configured to determine the variable rate of deceleration.

Clause 21—The circuit arrangement of any of clauses 15 to 19, wherein decreasing the velocity of the electric motor to a velocity less than the target velocity is in response to a fixed rate of deceleration, wherein the control unit is further configured to determine the variable rate of deceleration.

Clause 22—The circuit arrangement of any of clauses 15 to 21, wherein the circuit arrangement operates in a sensorless arrangement.

Clause 23—The circuit arrangement of any of clauses 15 to 22, wherein the electric motor is a stepper motor.

General

Each block of FIG. 7 and FIG. 9 is shown and defined for explanatory purposes only, it would be well understood that the algorithm or function which each block represents may be implemented in a plurality of other ways so long as the functionality as described is present. For example, the blocks of FIG. 7 and/or 9 may be combined and implemented as part of a circuit arrangement, on a single integrated circuit, processor, or computer, or implemented by a plurality of circuit arrangements, integrated circuits, processors, and/or computers.

Although the above-described examples are in reference to a stepper motor, it will be recognised that due to structural similarities of other types of electric motors, such as brushless DC (BLDC) motors, or Permanent Magnet Synchronous Motors (PMSMs), the methods and circuit arrangements of embodiments disclosed herein may also apply to other types of electrical motors comprising at least a first motor coil and a second motor coil. Particularly, the methods and circuit arrangements of embodiments disclosed herein may control stepper motors as well as successive commutated BLDC/PMSM motors. In addition, the electric motors may have two or more motor coils.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to."

The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

It is to be understood that one or more features from one or more of the above-described embodiments may be combined with one or more features of one or more other ones of the above-described embodiments, so as to form further embodiments which are within the scope of the appended claims.

What is claimed is:

1. A method of operating an electric motor in a control loop, the electric motor comprising at least a first motor coil and a second motor coil, the method comprising:
   operating the electric motor at a velocity equal to a target velocity;
   receiving a load value associated with an electric motor load;
   determining whether the load value is greater than an upper load value threshold;
   decreasing the velocity of the electric motor to less than the target velocity based on the load value being greater than the upper load value threshold;
   determining whether the load value is less than a lower load value threshold; and
   increasing the velocity of the electric motor to the target velocity based on the load value being less than the lower load value threshold.

2. The method of claim 1, further comprising:
   receiving a first motor coil current from the first motor coil; and
   receiving a second motor coil current from the second motor coil, and wherein the load value is proportional to an absolute value of the first motor coil current and the second motor coil current.

3. The method of claim 1, further comprising receiving a load angle of the electric motor, and wherein the load value is proportional to the load angle.

4. The method of claim 1, wherein determining whether the load value is greater than the upper load value threshold includes determining whether the load value is greater based on the upper load value threshold being between the lower load value threshold and a stall load value which, if exceeded, results in motor stall of the electric motor.

5. The method of claim 4, wherein determining whether the load value is greater than the upper load value threshold includes determining whether the load value is greater based on the upper load value threshold being greater than the lower load value threshold.

6. The method of claim 1, further comprising determining a maximum rate of velocity decrease over time for the electric motor is greater than a maximum rate of velocity increase over time for the electric motor.

7. The method of claim 1, wherein increasing the velocity of the electric motor to the target velocity includes increasing the velocity of the electric motor with a fixed rate of acceleration.

8. The method of claim 1, wherein increasing the velocity of the electric motor to the target velocity includes increasing the velocity of the electric motor with a variable rate of acceleration, and wherein the variable rate of acceleration is determined by a PI-regulator.

9. The method of claim 1, wherein decreasing the velocity of the electric motor to less than the target velocity includes decreasing the velocity of the electric motor with a fixed rate of deceleration.

10. The method of claim 1, wherein decreasing the velocity of the electric motor to less than the target velocity includes decreasing the velocity of the electric motor with a variable rate of deceleration, and wherein the variable rate of deceleration is determined by a PI-regulator.

11. The method of claim 1, wherein determining whether the load value is greater than the upper load value threshold includes determining whether the load value is greater based on the upper load value threshold being selected to be between 70% and 100% of a stall load value.

12. The method of claim 1, further comprising operating the control loop of the electric motor in a sensorless arrangement.

13. The method of claim 1, wherein operating the electric motor includes operating a stepper motor.

14. A circuit arrangement for operating an electric motor in a control loop, the electric motor comprising a first motor coil and a second motor coil, the circuit arrangement comprising a control unit configured to:
   operate the electric motor at a velocity equal to a target velocity;
   receive a load value associated with an electric motor load;
   determine whether the load value is greater than an upper load value threshold;
   decrease the velocity of the electric motor to less than the target velocity based on the load value being greater than the upper load value threshold;
   determine whether the load value is less than a lower load value threshold; and
   increase the velocity of the electric motor to the target velocity based on the load value being less than the lower load value threshold and the upper load value threshold.

15. The circuit arrangement of claim 14, further comprising an analog-to-digital converter configured to:
   receive a first motor coil current from the first motor coil; and
   receive a second motor coil current from the second motor coil, and wherein the load value is proportional to an absolute value of the first motor coil current and the second motor coil current.

16. The circuit arrangement of claim 14, wherein the control unit is configured to increase the velocity of the electric motor to the target velocity with a variable rate of acceleration, and wherein the control unit comprises a PI-regulator configured to determine the variable rate of acceleration.

17. The circuit arrangement of claim 14, wherein the circuit arrangement operates in a sensorless arrangement.

18. The circuit arrangement of claim 14, wherein the electric motor is a stepper motor.

\* \* \* \* \*